(12) United States Patent
Liao et al.

(10) Patent No.: US 10,732,870 B2
(45) Date of Patent: Aug. 4, 2020

(54) METHOD AND APPARATUS FOR TRIGGERING RAID RECONSTRUCTION

(71) Applicant: HUAWEI TECHNOLOGIES CO., LTD., Shenzhen (CN)

(72) Inventors: Defu Liao, Shenzhen (CN); Guannan Zhang, Hangzhou (CN); Lin Peng, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/234,618

(22) Filed: Dec. 28, 2018

(65) Prior Publication Data

US 2019/0129634 A1 May 2, 2019

Related U.S. Application Data

(63) Continuation of application No. PCT/CN2017/072991, filed on Feb. 6, 2017.

(30) Foreign Application Priority Data

Jun. 29, 2016 (CN) .......................... 2016 1 0494170

(51) Int. Cl.
*G06F 12/00* (2006.01)
*G06F 3/06* (2006.01)
*G06F 11/16* (2006.01)
*G06F 11/10* (2006.01)

(52) U.S. Cl.
CPC .......... *G06F 3/0632* (2013.01); *G06F 3/0617* (2013.01); *G06F 3/0689* (2013.01); *G06F 11/1088* (2013.01); *G06F 11/16* (2013.01); *G06F 3/0629* (2013.01)

(58) Field of Classification Search
CPC .... G06F 3/0632; G06F 11/16; G06F 11/1088; G06F 3/0617; G06F 3/0689; G06F 3/0629
USPC .................................................. 711/161, 162
See application file for complete search history.

(56) References Cited

U.S. PATENT DOCUMENTS

| 2006/0224560 | A1 | 10/2006 | Makita |
| 2011/0276859 | A1* | 11/2011 | Baba ................... G06F 11/1092 714/770 |
| 2012/0079317 | A1 | 3/2012 | Nelogal et al. |
| 2013/0132770 | A1 | 5/2013 | Guan |

FOREIGN PATENT DOCUMENTS

| CN | 1848069 | A | 10/2006 |
| CN | 101980137 | A | 2/2011 |
| CN | 102968358 | A | 3/2013 |
| CN | 103049400 | A | 4/2013 |
| CN | 104461791 | A | 3/2015 |
| CN | 106126378 | A | 11/2016 |
| WO | 2014082216 | A1 | 6/2014 |

* cited by examiner

*Primary Examiner* — Mardochee Chery
(74) *Attorney, Agent, or Firm* — Kilpatrick Townsend & Stockton LLP

(57) ABSTRACT

A method and an apparatus for triggering RAID reconstruction are disclosed, to achieve high universality and usability in triggering RAID reconstruction. The method includes: obtaining valid data information of a target storage medium after a change in storage mediums in a RAID is detected (S101); and reconstructing the RAID if the valid data information satisfies a preset reconstruction condition (S102).

15 Claims, 1 Drawing Sheet

Obtain valid data information of a target storage medium after a change in storage mediums in a disk array is detected — 101

Reconstruct the disk array if it is determined that the valid data information satisfies a preset reconstruction condition — 102

METHOD AND APPARATUS FOR TRIGGERING RAID RECONSTRUCTION

CROSS-REFERENCE TO RELATED APPLICATIONS

This application is a continuation of International Application No. PCT/CN2017/072991, filed on Feb. 6, 2017, which claims priority to Chinese Patent Application No. 201610494170.9, filed on Jun. 29, 2016. The disclosures of the aforementioned applications are hereby incorporated by reference in their entireties.

TECHNICAL FIELD

The present disclosure relates to the field of information technologies, and in particular, to a method and an apparatus for triggering RAID reconstruction.

BACKGROUND

To improve performance and reliability of storage systems, redundant array of independent disks (RAID) is widely applied to the storage systems. However, in a large-scale storage system, a disk failure has become a normal state. Therefore, a RAID needs to be reconstructed. Before the RAID is reconstructed, a problem in an aspect of RAID reconstruction triggering needs to be resolved first.

RAID reconstruction triggering solutions currently provided mainly include: a solution 1: triggering reconstruction using dedicated configuration software; and a solution 2: triggering reconstruction in a startup phase of a basic input/output system (BIOS).

However, the solution 1 relies on the dedicated configuration software, and requires a manual operation by a user. In the solution 2, a startup speed is severely affected, the reconstruction takes a long time, and the user easily causes a data loss due to negligence. Therefore, the existing solutions have problems such as low universality and usability.

SUMMARY

Embodiments of the present disclosure provide a method and an apparatus for triggering RAID reconstruction, to achieve high universality and usability in triggering RAID reconstruction.

In view of this, a first aspect of the present disclosure provides a method for triggering RAID reconstruction, including:

obtaining valid data information of a target storage medium after a change in storage mediums in a RAID is detected, where the target storage medium is a storage medium that causes the change in the storage mediums in the RAID; and reconstructing the RAID if the valid data information satisfies a preset reconstruction condition.

The RAID may include a plurality of storage mediums. The storage mediums may be SD cards. In this case, the change in the storage mediums may be a change in the SD cards. A scenario of the change in the SD cards may be that in a power-off or offline state, an SD card is replaced, and then a change in the SD cards is detected after power-on and startup; or in an online or power-on state, an SD card is hot swapped, such that a change in the SD cards is detected.

It can be learned that, in a case of the change in the storage mediums in the RAID, for example, when a storage medium is replaced, if the valid data information of the target storage medium that causes the change in the storage mediums in the RAID satisfies the preset reconstruction condition, the RAID reconstruction can be triggered. Obviously, the present disclosure features higher universality and usability than existing solutions.

In some possible implementations, the obtaining valid data information of a target storage medium after a change in storage mediums in a RAID is detected includes: in a power-off or offline state, obtaining the valid data information of the target storage medium after it is detected that a storage medium in the RAID is replaced; or in an online or power-on state, obtaining the valid data information of the target storage medium after it is detected that a storage medium in the RAID is hot swapped.

In some other possible implementations, before the reconstructing the RAID if the valid data information satisfies a preset reconstruction condition, the method includes:

determining whether at least one of data occupation information, file system information, partition information, or startup information exists in the valid data information, and if the at least one of the data occupation information, the file system information, the partition information, or the startup information exists in the valid data information, determining that the valid data information satisfies the preset reconstruction condition.

In some other possible implementations, after the reconstructing the RAID, the method further includes:

updating information about the RAID.

In some other possible implementations, the storage medium includes at least one of the following: a secure digital memory card or a hard disk; and the valid data information includes at least one of the following: partition information, startup information, file system information, or data occupation information.

A second aspect of the present disclosure provides an apparatus for triggering RAID reconstruction, including:

an obtaining module, configured to obtain valid data information of a target storage medium after a change in storage mediums in a RAID is detected, where the target storage medium is a storage medium that causes the change in the storage mediums in the RAID; and a reconstruction module, configured to reconstruct the RAID if the valid data information satisfies a preset reconstruction condition.

In some possible implementations, the obtaining module is specifically configured to: in a power-off or offline state, obtain the valid data information of the target storage medium after it is detected that a storage medium in the RAID is replaced; or in an online or power-on state, obtain the valid data information of the target storage medium after it is detected that a storage medium in the RAID is hot swapped.

In some other possible implementations, the apparatus further includes:

a determining module, configured to: determine whether at least one of data occupation information, file system information, partition information, or startup information exists in the valid data information, and if the at least one of the data occupation information, the file system information, the partition information, or the startup information exists in the valid data information, determine that the valid data information satisfies the preset reconstruction condition.

In some other possible implementations, the apparatus further includes: an update module, configured to update information about the RAID after the reconstruction module reconstructs the RAID.

In some other possible implementations, the storage medium includes at least one of the following: a secure digital memory card or a hard disk; and the valid data information includes at least one of the following: partition information, startup information, file system information, or data occupation information.

It can be learned from the foregoing technical solutions that the embodiments of the present disclosure have the following advantage: in a case of the change in the storage mediums in the RAID, for example, when a storage medium is replaced, if the valid data information of the target storage medium that causes the change in the storage mediums in the RAID satisfies the preset reconstruction condition, the RAID reconstruction can be triggered. Obviously, the present disclosure features higher universality and usability than existing solutions.

BRIEF DESCRIPTION OF DRAWINGS

To describe the technical solutions in the embodiments of the present disclosure more clearly, the following briefly describes the accompanying drawings required for describing the embodiments. Apparently, the accompanying drawings in the following description show merely some embodiments of the present disclosure, and persons of ordinary skill in the art may still derive other drawings from these accompanying drawings without creative efforts.

DESCRIPTION OF EMBODIMENTS

Embodiments of the present disclosure provide a method and an apparatus for triggering RAID reconstruction, to achieve high universality and usability in triggering RAID reconstruction.

To make persons skilled in the art understand the technical solutions in the present disclosure better, the following clearly describes the technical solutions in the embodiments of the present disclosure with reference to the accompanying drawings in the embodiments of the present disclosure. Apparently, the described embodiments are merely some rather than all of the embodiments of the present disclosure. All other embodiments obtained by persons of ordinary skill in the art based on the embodiments of the present disclosure without creative efforts shall fall in the protection scope of the present disclosure.

In the specification, claims, and accompanying drawings of the present disclosure, the terms "first", "second", and so on (if any) are intended to distinguish between similar objects but do not necessarily indicate a specific order or sequence. It should be understood that the data termed in such a way are interchangeable in proper circumstances such that the embodiments of the present disclosure described herein can be implemented in other orders than the order illustrated or described herein. Moreover, the terms "include", "contain" and any other variants mean to cover the non-exclusive inclusion, for example, a process, method, system, product, or device that includes a list of steps or units is not necessarily limited to those expressly listed steps or units, but may include other steps or units not expressly listed or inherent to such a process, method, product, or device.

The following first briefly describes some concepts that may be used in the embodiments of the present disclosure.

A boot sector (Boot Sector) is a first sector of a hard disk. The boot sector includes three parts: a master boot record (MBR), a disk partition table (DPT), and a boot record identifier (Boot Record ID). The MBR occupies the first 446 bytes (0 to 0x1BD) of the boot sector, and is used to store a master boot program of a system. The DPT occupies 64 bytes (0x1BE to 0x1FD), and is used to record basic partition information of a disk. The DPT is divided into four partition items. Each item is of 16 bytes, and records information about each master partition. The boot record ID occupies two bytes (0x1FE and 0x1FF). For a valid boot sector, a boot record ID is equal to 0xAA55.

A RAID, for example, a secure digital memory card (SD) RAID, is mainly a controller card or a portable device that has a RAID control chip, and two SD cards may be inserted to form a RAID. Generally, in consideration of both reliability and costs of the SD RAID, the two SD cards may be generally configured to have no RAID, or to a RAID 1. Related configuration information is stored in the corresponding SD cards.

Figure 1:
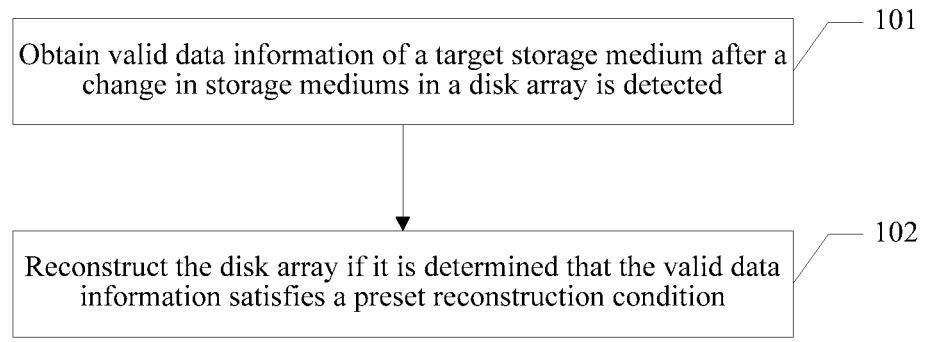
FIG. 1 is a schematic diagram of an embodiment of a method for triggering RAID reconstruction according to embodiments of the present disclosure.

Referring to FIG. 1, an embodiment of triggering RAID reconstruction in the embodiments of the present disclosure includes the following steps.

101: Obtain valid data information of a target storage medium after a change in storage mediums in a RAID is detected.

In this embodiment, the RAID may include a plurality of storage mediums. The storage mediums may be SD cards. In this case, the change in the storage mediums may be a change in the SD cards. A scenario of the change in the SD cards may be that in a power-off or offline state, an SD card is replaced, and then a change in the SD cards is detected after power-on and startup; or in an online or power-on state, an SD card is hot swapped, such that a change in the SD cards is detected.

For example, the RAID has two SD cards: an SD card 1 and an SD card 2. A user removes the SD card 2, and inserts an external SD card 3. In this case, cards existing in the RAID are the SD card 1 and the SD card 3. This indicates a change (SD card replacement) in the SD cards in the RAID. In this case, the SD card 3 is an SD card that causes the change in the SD cards in the RAID.

For another example, the RAID has two SD cards: an SD card 1 and an SD card 2. A user removes the SD card 2, and then inserts the SD card 2. In this case, a change (SD card hot swap) also occurs in the SD cards in the RAID. It should be noted that, in this case, the SD card 2 in the RAID is an SD card that causes the change in the SD cards in the RAID.

102: Reconstruct the RAID if the valid data information satisfies a preset reconstruction condition.

In this embodiment, if the valid data information satisfies the preset reconstruction condition, the RAID reconstruction is triggered.

The preset reconstruction condition may be set by the user, or may be preset by a vendor. This is not limited herein.

In this embodiment, in a case of the change in the storage mediums in the RAID, for example, when a storage medium is replaced, if the valid data information of the target storage medium that causes the change in the storage mediums in the RAID satisfies the preset reconstruction condition, the RAID reconstruction can be triggered. Obviously, the present disclosure features higher universality and usability than existing solutions.

It should be noted that, if the storage mediums are SD cards, in a embodiment, the method includes:

obtaining valid data information of a target SD card after a change in the SD cards in the RAID is detected, where the target SD card is an SD card that causes the change in the SD cards in the RAID; and reconstructing the RAID if the valid data information satisfies the preset reconstruction condition.

Referring to FIG. 1, in some embodiments of the present disclosure, before the reconstructing the RAID if the valid data information satisfies a preset reconstruction condition, the method includes:

determining whether at least one of data occupation information, file system information, partition information, or startup information exists in the valid data information, and if the at least one of the data occupation information, the file system information, the partition information, or the startup information exists in the valid data information, determining that the valid data information satisfies the preset reconstruction condition.

In this embodiment, when the valid data information satisfies the preset reconstruction condition, the reconstruction may be automatically performed. In this way, during use, the user does not need to perform the reconstruction using dedicated configuration software or when a BIOS is started. For example, only the data occupation information and the file system information need to be deleted from the target storage medium, and then the target storage medium may be inserted into the RAID as a synchronized card, to automatically start the reconstruction.

In addition, when there is no partition information in the valid data information, the user may perform low formatting processing on the target storage medium, to prevent a loss of the partition information.

Referring to FIG. 1, in some embodiments of the present disclosure, after the reconstructing the RAID, the method further includes:

updating information about the RAID.

Referring to FIG. 1, in some embodiments of the present disclosure, the storage medium includes at least one of the following: a secure digital memory card or a hard disk; and the valid data information includes at least one of the following: partition information, startup information, file system information, or data occupation information.

The secure digital memory card is an SD card.

If the storage mediums are SD cards, and the target storage medium is a target SD card, the partition information is partition information on the target SD card, and the partition information may be obtained using a boot sector of a disk. The startup information may be determined by first determining whether a partition status in information in a disk partition table is activated and then determining, if the partition status is activated, whether a boot sector of the partition has content. The file system information may be determined by parsing a root directory entry in a partition. If there is no directory or file in a root directory, it may be considered that the valid data information does not include the file system information. If there is a directory or a file in a root directory, it may be considered that the valid data information includes the file system information. A difference between the data occupation information and the file system information is that the file system information may include only an empty file or an empty folder, and the data occupation information may be used to determine whether there is a file whose size is not zero, and the data occupation information needs to be obtained by parsing the disk partition table and accessing a data area.

Figure 2:
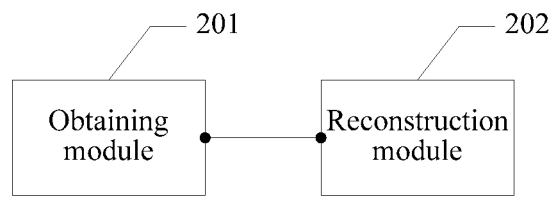
FIG. 2 is a schematic diagram of an embodiment of an apparatus for triggering RAID reconstruction according to embodiments of the present disclosure.

An embodiment of the present disclosure further provides an apparatus for triggering RAID reconstruction. Referring to FIG. 2, an embodiment of the apparatus for triggering RAID reconstruction in the embodiments of the present disclosure includes:

an obtaining module 201, configured to obtain valid data information of a target storage medium after a change in storage mediums in a RAID is detected, where the target storage medium is a storage medium that causes the change in the storage mediums in the RAID; and a reconstruction module 202, configured to reconstruct the RAID if the valid data information satisfies a preset reconstruction condition.

In this embodiment, the RAID may include a plurality of storage mediums. The storage mediums may be SD cards. In this case, the change in the storage mediums may be a change in the SD cards. A scenario of the change in the SD cards may be that in a power-off/offline state, an SD card is replaced, and then a change in the SD cards is detected after power-on and startup; or in an online/power-on state, an SD card is hot swapped, such that a change in the SD cards is detected.

For example, the RAID has two SD cards: an SD card 1 and an SD card 2. A user removes the SD card 2, and inserts an external SD card 3. In this case, cards existing in the RAID are the SD card 1 and the SD card 3. This indicates a change (SD card replacement) in the SD cards in the RAID. In this case, the SD card 3 is an SD card that causes the change in the SD cards in the RAID.

For another example, the RAID has two SD cards: an SD card 1 and an SD card 2. A user removes the SD card 2, and then inserts the SD card 2. In this case, a change (SD card hot swap) also occurs in the SD cards in the RAID. It should be noted that, in this case, the SD card 2 in the RAID is an SD card that causes the change in the SD cards in the RAID.

In this embodiment, in a case of the change in the storage mediums in the RAID, for example, when a storage medium is replaced, if the valid data information of the target storage medium that causes the change in the storage mediums in the RAID satisfies the preset reconstruction condition, the RAID reconstruction can be triggered. Obviously, the present disclosure features higher universality and usability than existing solutions.

Optionally, referring to FIG. 2, in some embodiments of the present disclosure, the obtaining module 201 is specifically configured to: in a power-off or offline state, obtain the valid data information of the target storage medium after it is detected that a storage medium in the RAID is replaced; or in an online or power-on state, obtain the valid data information of the target storage medium after it is detected that a storage medium in the RAID is hot swapped.

Figure 3:
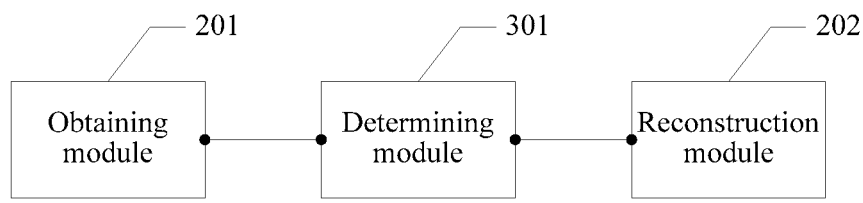
FIG. 3 is a schematic diagram of another embodiment of an apparatus for triggering RAID reconstruction according to embodiments of the present disclosure.

Optionally, based on FIG. 2, referring to FIG. 3, in some embodiments of the present disclosure, the apparatus further includes: a determining module 301, configured to: determine whether at least one of data occupation information, file system information, partition information, or startup information exists in the valid data information, and if the at least one of the data occupation information, the file system information, the partition information, or the startup information exists in the valid data information, determine that the valid data information satisfies the preset reconstruction condition.

In this embodiment, when the valid data information satisfies the preset reconstruction condition, the reconstruction may be automatically performed. In this way, during use, the user does not need to perform the reconstruction using dedicated configuration software or when a BIOS is started. For example, only the data occupation information and the file system information need to be deleted from the target storage medium, and then the target storage medium may be inserted into the RAID as a synchronized card, to automatically start the reconstruction.

In addition, when there is no partition information in the valid data information, the reconstruction may be automatically performed, and the user may perform low formatting processing on the target storage medium, to prevent a loss of the partition information.

Figure 4:
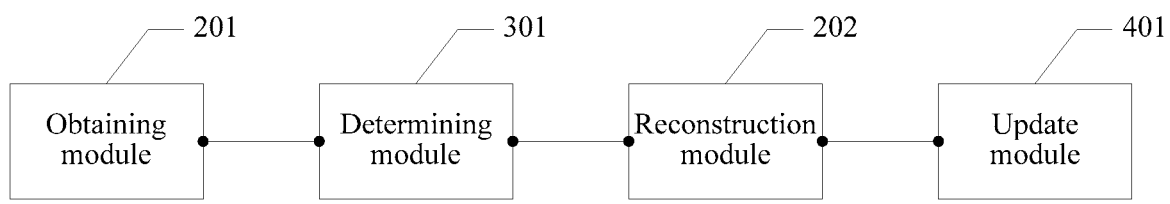
FIG. 4 is a schematic diagram of another embodiment of an apparatus for triggering RAID reconstruction according to embodiments of the present disclosure.

Optionally, based on FIG. 3, referring to FIG. 4, in some embodiments of the present disclosure, the apparatus further includes: an update module 401, configured to update information about the RAID after the reconstruction module 202 reconstructs the RAID.

Optionally, referring to FIG. 2, in some embodiments of the present disclosure, the storage medium includes at least one of the following: a secure digital memory card or a hard disk; and the valid data information includes at least one of the following: partition information, startup information, file system information, or data occupation information.

The secure digital memory card is an SD card.

If the storage mediums are SD cards, and the target storage medium is a target SD card, the partition information is partition information on the target SD card, and the partition information may be obtained using a boot sector of a disk. The startup information may be determined by first determining whether a partition status in information in a disk partition table is activated and then determining, if the partition status is activated, whether a boot sector of the partition has content. The file system information may be determined by parsing a root directory entry in a partition. If there is no directory or file in a root directory, it may be considered that the valid data information does not include the file system information. If there is a directory or a file in a root directory, it may be considered that the valid data information includes the file system information. A difference between the data occupation information and the file system information is that the file system information may include only an empty file or an empty folder, and the data occupation information may be used to determine whether there is a file whose size is not zero, and the data occupation information needs to be obtained by parsing the disk partition table and accessing a data area.

It should be noted that, in some possible embodiments, the reconstruction module 202 may be split into two sub-units. For example, the reconstruction module 202 is split into a determining unit and a reconstruction unit. The determining unit is configured to determine whether the valid data information satisfies the preset reconstruction condition, and the reconstruction unit is configured to reconstruct the RAID if the determining unit determines that the valid data information satisfies the preset reconstruction condition. During actual application, the determining unit may be located in out-of-band management software, an in-band operating system, or a RAID controller. That is, the determining unit, the obtaining module 201, and the reconstruction unit may be located in, but not limited to, a same apparatus, for example, located in a RAID controller inside a same apparatus.

It may be clearly understood by persons skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present disclosure may be integrated into one processing unit, or each of the units may exist alone physically, or two or more units are integrated into one unit. The integrated unit may be implemented in a form of hardware, or may be implemented in a form of a software functional unit. When the integrated unit is implemented in the form of a software functional unit and sold or used as an independent product, the integrated unit may be stored in a computer-readable storage medium. Based on such an understanding, the technical solutions of the present disclosure essentially, or the part contributing to the prior art, or all or some of the technical solutions may be implemented in the form of a software product. The computer software product is stored in a storage medium and includes several instructions for instructing a computer device (which may be a personal computer, a server, a network device, or the like) to perform all or some of the steps of the methods described in the embodiments of the present disclosure. The foregoing storage medium includes: any medium that can store program code, such as a USB flash drive, a removable hard disk, a read-only memory (ROM), a random access memory (RAM), a magnetic disk, or an optical disc. The foregoing embodiments are merely intended for describing the technical solutions of the present disclosure, but not for limiting the present disclosure. Although the present disclosure is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of the present disclosure.

What is claimed is:

1. A method for triggering redundant array of independent disks (RAID) reconstruction, wherein the method performed by a controller comprises:

obtaining valid data information of a target storage medium of multiple storage mediums when a change caused by the target storage medium in the RAID is detected; and reconstructing the RAID when the valid data information comprises data occupation information, wherein the data occupation information facilitates determining whether there is a file whose size is not zero and the data occupation information is obtained by parsing the disk partition table and accessing a data area.

2. The method according to claim 1, wherein the obtaining valid data information of a target storage medium when a change in storage mediums in a RAID is detected comprises:
obtaining the valid data information of the target storage medium when detecting that a storage medium in the RAID is replaced.

3. The method according to claim 1, wherein the obtaining valid data information of a target storage medium after a change in storage mediums in a RAID is detected comprises:
obtaining the valid data information of the target storage medium when detecting that a storage medium in the RAID is hot swapped.

4. The method according to claim 1, wherein after the reconstructing the RAID, the method further comprises:
updating information about the RAID.

5. The method according to claim 1, wherein the storage medium comprises at least one of the following: a secure digital memory card or a hard disk; and the valid data information comprises at least one of the following: partition information, startup information, file system information, or data occupation information.

6. An apparatus for triggering RAID reconstruction, comprising:
a memory configured to store instructions; and
a processor coupled to the memory and configured to execute the instructions to:
obtain valid data information of a target storage medium when a change in storage mediums in a RAID is detected, wherein the target storage medium is a storage medium that causes the change in the storage mediums in the RAID; and
reconstruct the RAID when the valid data information comprises data occupation information; wherein the data occupation information facilitates determining whether there is a file whose size is not zero and the data occupation information is obtained by parsing the disk partition table and accessing a data area.

7. The apparatus according to claim 6, wherein the processor is configured to:
obtain the valid data information of the target storage medium when detecting that a storage medium in the RAID is replaced.

8. The apparatus according to claim 6, wherein the processor is configured to:
obtain the valid data information of the target storage medium when detecting that a storage medium in the RAID is hot swapped.

9. The apparatus according to claim 6, wherein the processor is configured to: update information about the RAID.

10. The apparatus according to claim 6, wherein the storage medium comprises at least one of the following: a secure digital memory card or a hard disk; and the valid data information comprises at least one of the following: partition information, startup information, file system information, or data occupation information.

11. An system for triggering RAID reconstruction, comprising:
a RAID configured to store data; and
a controller coupled to the storage mediums and configured to:
obtain valid data information of a target storage medium when a change in storage mediums in the RAID is detected, wherein the target storage medium is a storage medium that causes the change in the storage mediums in the RAID; and
reconstruct the RAID when the valid data information comprises data occupation information, wherein the data occupation information facilitates determining whether there is a file whose size is not zero, determining that whether the valid data information comprises data occupation information and the data occupation information is obtained by parsing the disk partition table and accessing a data area.

12. The system according to claim 11, wherein the controller is configured to:
obtain the valid data information of the target storage medium when detecting that a storage medium in the RAID is replaced.

13. The system according to claim 11, wherein the controller is configured to:
obtain the valid data information of the target storage medium when detecting that a storage medium in the RAID is hot swapped.

14. The system according to claim 11, wherein the controller is configured to: update information about the RAID.

15. The system according to claim 11, wherein the storage medium comprises at least one of the following: a secure digital memory card or a hard disk; and the valid data information comprises at least one of the following: partition information, startup information, file system information, or data occupation information.

* * * * *